3,312,343
AIR SEPARATOR
Robert L. Elder and Robert A. Waddail, Sr., Newton, Kans., assignors to Hesston Corporation, Inc., a corporation of Kansas
Filed May 7, 1964, Ser. No. 365,718
6 Claims. (Cl. 209—139)

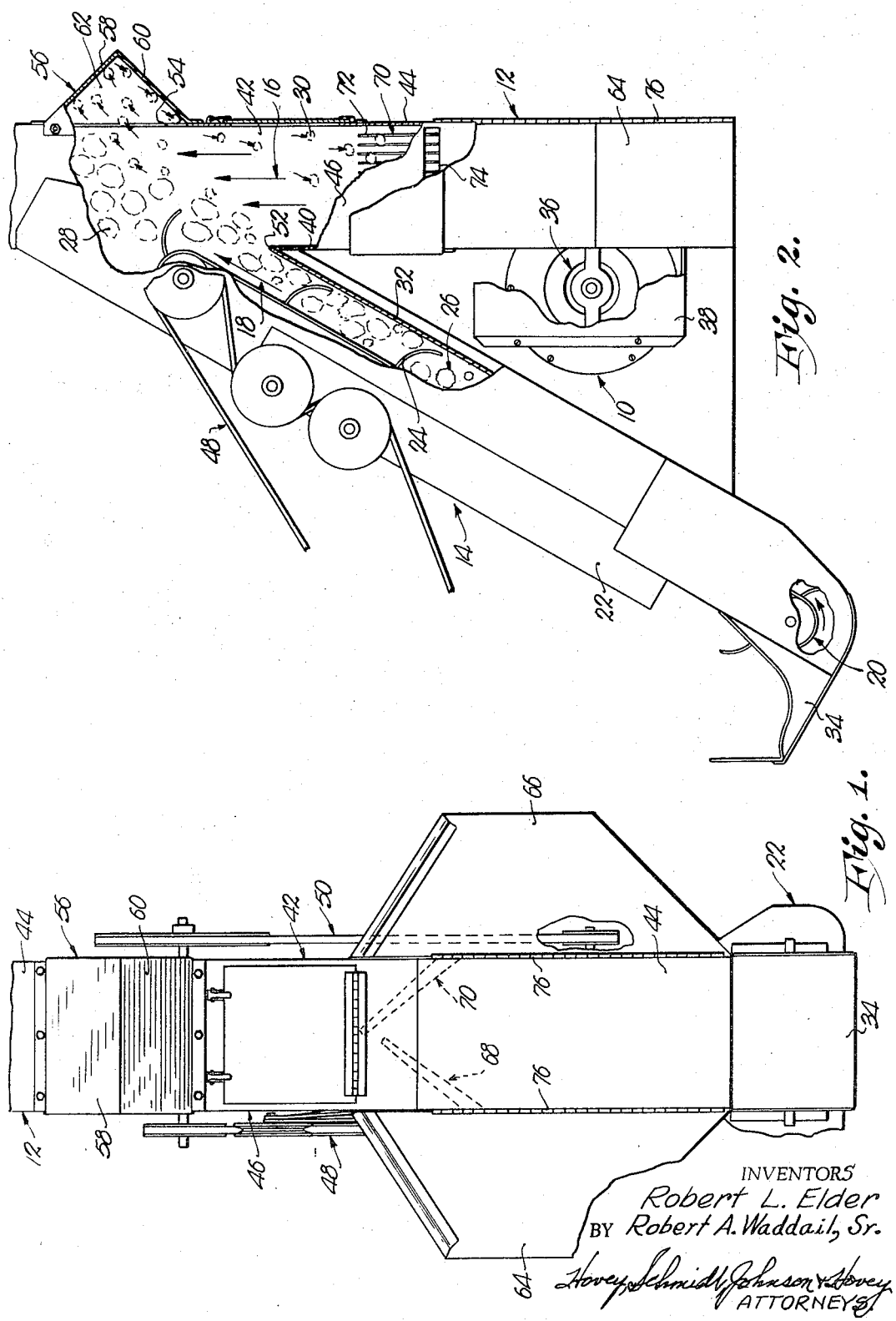

This invention relates to separation of materials through use of air, having for its primary object the advantageous utilization of an air stream, together with a novel manner of directing a product into and through the air stream such that the light and heavy materials of the product are directed along different paths of travel to spaced points of deposit.

The principles of the instant invention are particularly adapted for use in connection with a harvested cotton crop containing both ripe or open bolls and green bolls. It is necessary, for monetary reasons, to remove as much foreign material as possible from the ripe cotton at the time of harvest because manifestly, bales of clean cotton bring a better price than those containing a substantial amount of undesirable matter such as trash. In order to accomplish these desired results, it is necessary to provide in the cotton harvester itself, a system of separation of the green bolls from the open bolls, operable in an efficient manner and permitting high speed operation that is not only trouble free but which requires very little operator attention.

In accordance with the foregoing therefore, it is an important object of the present invention to provide an air system of separation which will obviate carry-over of the green bolls into the air stream which conveys the open bolls to the collection bin forming a part of the harvester.

Another important object of the instant invention is to so relate the means of the harvester for elevating the crop from the harvester units of the machine with an air stream that, as the result of such correlation, the open bolls are removed from the crop as the latter is projected across the air stream, and the green bolls are collected at a zone outside the air stream for subsequent direction to a point of deposit remote from the ripe cotton bin.

Still another important object of this invention is to provide for absorption of the initial energy of the green bolls resulting from conveyance, and to thereupon guide and direct the green bolls back into the air stream below the ripe cotton for gravitation within the air conduit to a green boll collector, all to the end that the entire separation method is carried out through use of inexpensive structure having minimum space requirements.

In the drawing:

FIGURE 1 is a fragmentary rear elevational view of a portion of a cotton harvester, illustrating one form of separator made pursuant to the principles of the instant invention and capable of carrying out the novel air separation method about to be described; and FIG. 2 is a fragmentary side elevational view of the separator illustrated in FIG. 1, parts being broken away and in section to revel details of construction.

The separator chosen for illustration of the principles of the instant invention is adapted for use in connection with virtually any type of cotton harvester whether tractor mounted, self-propelled or pulled; the gathering assembly of the harvester has not, therefore, been illustrated in the drawing. The separator includes apparatus 10 for producing artificial currents of air, structure 12 for receiving the air and confining it for flow as a continuous stream in a single direction along a preselected path of travel, and mechanism 14 for projecting the harvested cotton crop into the air stream, the latter of which is designated by the numeral 16 and represented by vertical arrows in FIG. 2 of the drawing. On the other hand, the oblique path of travel of the harvested cotton crop, upwardly and laterally with respect to the air stream 16 is designated by the arrow 18 in FIG. 2.

The mechanism 14 is in the nature of a conveyor or elevator 20 mounted within an inclined elevator shaft 22 and having its flights 24 arranged to project the crop 26 (containing ripe bolls 28 and green bolls 30) upwardly and laterally along bottom 32 of the shaft 22. An open top hopper 34 forming a part of the shaft 22 at its lowermost end receives the harvested cotton crop 26 and it is from the hopper 34 that conveyor 20 receives the crop and projects into the air stream 16.

Apparatus 10 is in the nature of a fan having opposed air inlets, one of which is illustrated in FIG 2 and designated by the numeral 36. An open top shield 38 is provided for each inlet 36 respectively to reduce the amount of dust, trash and other foreign matter entering the inlets 36.

Fan 10 discharges directly into the structure 12 adjacent its lowermost end through one wall 40 thereof. Structure 12, consisting of an upright conduit has three additional walls 42, 44 and 46 and it is closed at its bottom. The upper end of the conduit 12 constitutes the outlet for the ripe bolls 28 discharging into a collection basket (not shown) forming a part of the harvesting machine.

The elevator 20 is driven from a suitable power source such as the tractor itself by a belt pulley assembly 48, continuing into belt and pulley means 50 for driving the fan 10.

The wall 40 of conduit 12 has an opening 52 spaced above the fan 10 placing it into direct communication with the upper end of the elevator shaft 22. The wall 44 has an opening 54 at a higher elevation than the lower extremities of the opening 52 covered or closed by a diverter broadly designated by the numeral 56 and mounted on the conduit 12 exteriorly thereof at a zone outside the bath of travel of air stream 16. Diverter 56 includes a bumper plate 58, substantially normal to the path of travel of the projected green bolls 30 and inclined downwardly and outwardly from its uppermost end. Diverter 56 is also provided with a slide plate 60, substantially normal to the bumper plate 58 and inclined downwardly and inwardly from the latter for joinder with the wall 44 adjacent the lower extremities of the opening 54. Opening 54 spans the distance between the walls 42 and 46 and terminates adjacent the uppermost edge of the bumper plate 58. The sides of the diverter 56 are closed by triangular walls joined to plates 58 and 60 as well as to wall 44, one of which is illustrated in FIG. 2 and designated by the numeral 62.

Green bolls 30 gravitating along the slide 60 and re-entering the conduit 12 through the opening 54 for gravitation in the conduit 12 oppositely to the path of travel of the air stream 16 are diverted laterally into collection bins 64 and 66 by deflectors 68 and 70 respectively. The deflectors 68 and 70, disposed below the lower edge of opening 52 are carried by corresponding walls 46 and 42 within the conduit 12 and extend upwardly and inwardly therefrom at an angle so that the green bolls 30 collected thereby are caused to slide downwardly and outwardly toward the walls 46 and 42 respectively. Deflectors 68 and 70 are in the nature of grids so as to not appreciably impede the upward flow of the air stream 16 constituting therefore, a plurality of spaced, elongated bars 72. An elongated slot 74 in the wall 42 above the deflector grid 70 but adjacent its lowermost end places the conduit 12 into communication with the bin 66 providing therefore, an outlet for the green bolls 30 landing on the bars 72 of the grid 70. A similar outlet (not shown) is provided in the wall 46 above the deflector grid 68 in register with the bin 64. The bins 64 and 66 are swingably mounted on conduit 12 by hinges 76, permitting emptying of the green bolls 30 therefrom.

In operation, as it is apparent in FIG. 2, the crop 26 is fed into the air stream 16 by the elevator 20 through the opening 52 and as soon as the ripe bolls 28 enter the air stream 16 they are carried upwardly in the conduit 12 for delivery into the aforementioned collection basket. On the other hand, the green bolls 30 are projected by the elevator 20 across the air stream 16, through the opening 54 and against the bumper plate 58, the latter of which operates to absorb the initial energy of the green bolls 30 allowing them to fall onto the slide 60.

The two materials 28 and 30 of differing weights and forming a part of the product 26 are therefore, effectively separated and directed to their own individual points of deposit for collection.

Having thus described the invention, what is claimed as new and desired to be secured by Letters Patent is:

1. A separation method for a harvested cotton crop containing both ripe and green bolls comprising the steps of:
   producing an airstream;
   confining the airstream for continuous upward flow;
   projecting the crop in a first direction along a first inclined path traversing the airstream whereby the ripe bolls are carried upwardly thereby from said path and the green bolls continue to move through and beyond the path of said airstream in said one direction;
   blocking further movement of the green bolls along said path after they reach a zone outside the airstream;
   collecting the green bolls dropping from said zone;
   guiding the green bolls for gravitation below said path in a second direction opposite to said first direction along a second inclined path and into said airstream for descent therein; and
   diverting the green bolls out of the airstream after they have gravitated a predetermined distance therein.

2. A separator for removing the green bolls from the ripe bolls of a harvested cotton crop, said separator comprising:
   a fan for producing artificial currents of air;
   a conduit for receiving said air currents and confining the same for flow as a continuous stream in one direction along a predetermined path of travel;
   an upwardly inclined crop conveyor for feeding the ripe bolls into the airstream for movement thereby in said one direction to a point of deposit and for projecting the green bolls across said airstream; and
   a diverter disposed outside said conduit within the path of projection of the green bolls, said diverter being in communication with the conduit and including means beyond the conduit for directing the green bolls in a path toward said conduit for return to the airstream.

3. A separator for removing the green bolls from the ripe bolls of a harvested cotton crop, said separator comprising:
   a fan for producing artificial currents of air;
   an upright conduit for receiving said air currents and confining the same for upward flow as a continuous stream along a predetermined path of travel;
   an upwardly inclined crop conveyor for feeding the ripe bolls into the airstream for upward movement thereby to a point of deposit and for projecting the green bolls across said airstream; and
   a diverter disposed outside said conduit having a bumper within the path of projection of the green bolls beyond the airstream for absorbing the energy thereof and a slide for receiving the green bolls and directing the same by gravitation into said conduit.

4. A separator for removing the green bolls from the ripe bolls of a harvested cotton crop, said separator comprising:
   an upright air conduit having a pair of opposed walls;
   an inclined elevator shaft communicating at its upper end with said conduit through one of said walls;
   a fan having a discharge communicating with the conduit below said upper end of the shaft for producing an airstream and directing the same up the conduit;
   an elevator in the shaft for conveying the crop up the latter and into the airstream whereby the ripe bolls are picked up by the airstream and blown toward the upper end of the shaft,
   the other of said walls having an opening within the path of the green bolls projected across the airstream by the elevator; and
   structure closing the opening including a bumper exteriorly of the conduit and normal to said path of the green bolls for absorbing the initial energy of the latter, permitting them to fall, and
   a slide exteriorly of the conduit normal to and beneath the bumper for receiving the falling bolls and directing them into the conduit for gravitation in the latter, said slide being inclined downwardly and inwardly toward said opening.

5. The invention of claim 4, said conduit having a second pair of opposed walls provided with green boll outlets below the slide; and means in the conduit for directing the gravitating bolls through said outlets.

6. The invention of claim 5, and a green boll collecting bin carried by each of said second pair of walls respectively exteriorly thereof and communicating with the corresponding outlets.

References Cited by the Examiner

UNITED STATES PATENTS

| | | | |
|---|---|---|---|
| 1,374,645 | 4/1921 | Franklin | 209—145 |
| 1,660,682 | 2/1928 | Stebbins | 209—138 |
| 2,791,001 | 5/1957 | Roscoe | 209—137 |
| 3,164,548 | 1/1965 | Roswell | 209—139 |

FOREIGN PATENTS

| | | |
|---|---|---|
| 839,031 | 5/1952 | Germany. |

FRANK W. LUTTER, *Primary Examiner.*